(12) United States Patent
Payen et al.

(10) Patent No.: US 9,301,644 B2
(45) Date of Patent: Apr. 5, 2016

(54) FRYER WITH AUTOMATIC COATING OF FAT

(75) Inventors: Jean-Marc Payen, Quetigny (FR); Jean-Claude Bizard, Fontaine-les-Dijon (FR)

(73) Assignee: SEB S.A., Ecully (FR)

( * ) Notice: Subject to any disclaimer, the term of this patent is extended or adjusted under 35 U.S.C. 154(b) by 2091 days.

(21) Appl. No.: 11/570,309

(22) PCT Filed: Jun. 8, 2005

(86) PCT No.: PCT/FR2005/001415
§ 371 (c)(1),
(2), (4) Date: May 15, 2008

(87) PCT Pub. No.: WO2006/000699
PCT Pub. Date: Jan. 5, 2006

(65) Prior Publication Data
US 2008/0213447 A1    Sep. 4, 2008

(30) Foreign Application Priority Data
Jun. 8, 2004 (FR) ..................... 04 06214

(51) Int. Cl.
| A47J 37/00 | (2006.01) |
| A23L 1/01 | (2006.01) |
| A47J 37/04 | (2006.01) |
| A47J 37/06 | (2006.01) |
| A47J 36/16 | (2006.01) |

(52) U.S. Cl.
CPC ............ *A47J 37/043* (2013.01); *A47J 37/0623* (2013.01); *A47J 37/0641* (2013.01); *A47J 36/165* (2013.01)

(58) Field of Classification Search
CPC . A47J 37/0641; A47J 37/0623; A47J 37/043; A47J 36/165
USPC ............ 99/347, 345, 348; 219/385; 426/438, 426/523
See application file for complete search history.

(56) References Cited

U.S. PATENT DOCUMENTS

| 119,169 | A | * | 9/1871 | Ogden ........................ 126/369 |
| 1,505,703 | A | * | 8/1924 | Darley ..................... 126/376.1 |
| 2,032,571 | A | * | 3/1936 | Gilbert et al. ................ 366/201 |
| 2,063,692 | A | * | 12/1936 | Martinet ...................... 366/200 |
| 2,169,323 | A | * | 8/1939 | Martinet ........................ 241/92 |
| 2,208,552 | A | * | 7/1940 | Walter ........................ 422/109 |
| 2,217,266 | A | * | 10/1940 | Cookson ...................... 202/163 |

(Continued)

FOREIGN PATENT DOCUMENTS

| CN | 2536153 Y | 2/2003 |
| DE | 2102062 | 7/1972 |

(Continued)

OTHER PUBLICATIONS

Mckeen, Fluorinated Coatings and Finishes Handbook (2006), Secs. 15.1 and 15.2.
European Patent Office, Decision de la Chambre de recours technique 3.2.04 du Mar. 27, 2012, No. du recours: T 1572/11 (EP 1781154).
Translation of European Patent Office, Decision of Technical Board of Appeal 3.2.04 of Mar. 27, 2012, Appeal No. T 1572/11 (EP 1781154).

*Primary Examiner* — Eric Stapleton
(74) *Attorney, Agent, or Firm* — Cooper & Dunham LLP

(57) ABSTRACT

A dry cooking fryer (1) comprising a main body (2) receiving food items that are to be fried, and a stirrer (6) automatically coats the items with a film of fat by mixing the food items with fat. The coated food items are cooked within the fryer without immersion in a cooking fluid.

37 Claims, 4 Drawing Sheets

(56) References Cited

U.S. PATENT DOCUMENTS

| | | | | |
|---|---|---|---|---|
| 2,222,390 A * | 11/1940 | Ackles | | 118/28 |
| 2,275,901 A * | 3/1942 | Harwood | | 219/201 |
| 2,615,690 A * | 10/1952 | Jepson | | 366/197 |
| 2,648,514 A * | 8/1953 | Rosier et al. | | 248/131 |
| 2,681,211 A * | 6/1954 | Reynolds | | 366/251 |
| 2,707,622 A * | 5/1955 | Vance | | 366/199 |
| 2,867,420 A * | 1/1959 | Potts | | 366/146 |
| 2,896,924 A * | 7/1959 | Jepson | | 241/101.1 |
| 2,905,452 A * | 9/1959 | Appleton | | 366/199 |
| 2,931,232 A * | 4/1960 | Martin | | 74/16 |
| 3,282,468 A * | 11/1966 | Karlen | | 222/67 |
| 3,528,401 A * | 9/1970 | Moore | | 126/369 |
| 3,633,490 A * | 1/1972 | Schiffmann et al. | | 99/339 |
| 3,635,147 A * | 1/1972 | Lee | | 99/348 |
| 3,677,174 A * | 7/1972 | Pelster et al. | | 99/417 |
| 3,783,770 A * | 1/1974 | Aries | | 99/348 |
| 3,827,677 A * | 8/1974 | Meyerhoefer et al. | | 366/282 |
| 3,856,220 A * | 12/1974 | Waters | | 241/282.1 |
| 4,043,916 A * | 8/1977 | Wecker, Sr. | | 210/238 |
| 4,048,473 A * | 9/1977 | Burkhart | | 219/389 |
| 4,120,981 A * | 10/1978 | Burkhart | | 426/231 |
| 4,134,998 A * | 1/1979 | Liebermann | | 426/438 |
| 4,188,410 A * | 2/1980 | Rispoli et al. | | 426/296 |
| 4,258,695 A * | 3/1981 | McCarton et al. | | 126/375.1 |
| 4,262,374 A * | 4/1981 | Mikiya et al. | | 4/537 |
| 4,269,861 A * | 5/1981 | Caridis et al. | | 426/438 |
| 4,339,307 A * | 7/1982 | Ellis, Jr. | | 202/176 |
| 4,397,298 A * | 8/1983 | Abell | | 126/369 |
| 4,417,506 A * | 11/1983 | Herbst et al. | | 99/348 |
| 4,435,084 A * | 3/1984 | Calhoun et al. | | 366/130 |
| 4,439,459 A * | 3/1984 | Swartley | | 426/438 |
| 4,462,308 A * | 7/1984 | Wang | | 99/413 |
| 4,509,412 A * | 4/1985 | Whittenburg et al. | | 99/331 |
| 4,574,776 A * | 3/1986 | Hidle | | 126/369 |
| 4,581,989 A * | 4/1986 | Swartley | | 99/346 |
| 4,613,086 A * | 9/1986 | Granum et al. | | 241/101.8 |
| 4,622,231 A * | 11/1986 | Swartley | | 426/438 |
| 4,649,810 A * | 3/1987 | Wong | | 99/326 |
| 4,650,968 A * | 3/1987 | Williams | | 219/401 |
| 4,706,558 A * | 11/1987 | Snyder, Jr. | | 99/348 |
| 4,728,762 A * | 3/1988 | Roth et al. | | 219/730 |
| 4,790,667 A * | 12/1988 | Pardo et al. | | 366/311 |
| 4,800,090 A * | 1/1989 | August | | 426/243 |
| 4,922,079 A * | 5/1990 | Bowen et al. | | 219/415 |
| 5,031,518 A * | 7/1991 | Bordes | | 99/338 |
| 5,048,402 A * | 9/1991 | Letournel et al. | | 99/348 |
| 5,092,229 A * | 3/1992 | Chen | | 99/337 |
| 5,097,753 A * | 3/1992 | Naft | | 99/341 |
| 5,097,754 A * | 3/1992 | Covington et al. | | 99/357 |
| 5,114,572 A * | 5/1992 | Hunter et al. | | 210/120 |
| 5,184,539 A * | 2/1993 | Oiwa | | 99/408 |
| 5,228,384 A * | 7/1993 | Kolosowski | | 99/342 |
| 5,235,904 A * | 8/1993 | Ludena | | 99/413 |
| 5,275,094 A * | 1/1994 | Naft | | 99/416 |
| 5,287,798 A * | 2/1994 | Takeda | | 99/413 |
| 5,363,747 A * | 11/1994 | Clark et al. | | 99/348 |
| 5,366,103 A * | 11/1994 | Abernathy et al. | | 220/23.83 |
| 5,380,086 A * | 1/1995 | Dickson | | 366/97 |
| 5,400,700 A * | 3/1995 | Bois | | 99/403 |
| 5,400,701 A * | 3/1995 | Sham | | 99/410 |
| 5,415,082 A * | 5/1995 | Nagao | | 99/403 |
| 5,441,169 A * | 8/1995 | Petty | | 220/573.4 |
| 5,445,073 A * | 8/1995 | Gilwood | | 99/427 |
| 5,460,289 A * | 10/1995 | Gemmell | | 220/495.02 |
| 5,466,912 A * | 11/1995 | Dornbush et al. | | 219/400 |
| 5,488,898 A * | 2/1996 | Hough | | 99/516 |
| 5,495,795 A * | 3/1996 | Harrison et al. | | 99/492 |
| RE35,283 E * | 6/1996 | Helmich | | 202/176 |
| 5,524,527 A * | 6/1996 | Dumoux et al. | | 99/333 |
| 5,524,530 A * | 6/1996 | Nijzingh et al. | | 99/492 |
| 5,525,782 A * | 6/1996 | Yoneno et al. | | 219/682 |
| 5,535,665 A * | 7/1996 | Wong | | 99/348 |
| 5,584,235 A * | 12/1996 | DuBois et al. | | 99/413 |
| 5,586,486 A * | 12/1996 | Nitschke et al. | | 99/330 |
| 5,590,583 A * | 1/1997 | Harrison | | 99/327 |
| 5,611,265 A * | 3/1997 | Ronci et al. | | 99/353 |
| 5,613,774 A * | 3/1997 | Chandra et al. | | 366/228 |
| 5,615,951 A * | 4/1997 | Gabriele | | 366/311 |
| 5,653,161 A * | 8/1997 | Nopanen et al. | | 99/415 |
| 5,794,524 A * | 8/1998 | Kemker et al. | | 99/348 |
| 5,794,525 A * | 8/1998 | Fan | | 99/413 |
| 5,801,357 A * | 9/1998 | Danen | | 219/403 |
| 5,865,104 A * | 2/1999 | Sham et al. | | 99/417 |
| 5,910,264 A * | 6/1999 | Dauliach | | 219/411 |
| 5,974,953 A * | 11/1999 | Messerli | | 99/340 |
| 5,992,307 A * | 11/1999 | Parker et al. | | 99/417 |
| 6,011,249 A * | 1/2000 | Chung | | 219/726 |
| 6,026,735 A * | 2/2000 | Waterworth | | 99/348 |
| 6,054,681 A * | 4/2000 | Siu | | 219/385 |
| 6,054,698 A * | 4/2000 | Mast | | 219/730 |
| 6,055,901 A * | 5/2000 | Gantos et al. | | 99/412 |
| 6,077,555 A * | 6/2000 | Dotan | | 426/438 |
| 6,079,319 A * | 6/2000 | Doria | | 99/331 |
| 6,098,527 A * | 8/2000 | Chang | | 99/330 |
| 6,125,738 A * | 10/2000 | Poister | | 99/339 |
| 6,172,339 B1* | 1/2001 | Thevenin | | 219/429 |
| 6,193,181 B1* | 2/2001 | Astegno et al. | | 241/282.1 |
| 6,225,605 B1* | 5/2001 | Beugnot et al. | | 219/432 |
| 6,230,612 B1* | 5/2001 | Rossi | | 99/446 |
| 6,267,046 B1* | 7/2001 | Wanat | | 99/332 |
| 6,307,193 B1* | 10/2001 | Toole | | 219/735 |
| 6,318,247 B1* | 11/2001 | Di Nunzio et al. | | 99/348 |
| 6,474,222 B1* | 11/2002 | Pretre | | 99/331 |
| 6,516,709 B1* | 2/2003 | Lin | | 99/331 |
| 6,629,491 B1* | 10/2003 | Chan | | 99/331 |
| 6,777,010 B1* | 8/2004 | Rolle et al. | | 426/238 |
| 6,834,577 B2* | 12/2004 | Xu | | 99/409 |
| 6,837,148 B1* | 1/2005 | Deschenes et al. | | 99/325 |
| 6,845,707 B1* | 1/2005 | Xu et al. | | 99/348 |
| 7,011,013 B2* | 3/2006 | Leason | | 99/339 |
| 7,098,427 B2* | 8/2006 | Ducarme et al. | | 219/437 |
| 7,145,105 B2* | 12/2006 | Gaulard | | 219/435 |
| 7,166,822 B1* | 1/2007 | Chang et al. | | 219/521 |
| 7,669,521 B2* | 3/2010 | Cartigny et al. | | 99/337 |
| D622,093 S * | 8/2010 | Reiner | | D7/354 |
| 7,993,694 B2* | 8/2011 | Goderiaux et al. | | 426/438 |
| 8,003,921 B2* | 8/2011 | Lagrange et al. | | 219/432 |
| 8,047,500 B2* | 11/2011 | Bergeret | | 249/127 |
| 8,166,871 B2* | 5/2012 | Veltrop et al. | | 99/410 |
| 2003/0037682 A1* | 2/2003 | Dzbinski | | 99/422 |
| 2003/0121421 A1* | 7/2003 | Wey | | 99/403 |
| 2004/0065211 A1* | 4/2004 | McNair | | 99/348 |
| 2004/0159244 A1* | 8/2004 | Leason | | 99/348 |
| 2004/0194636 A1* | 10/2004 | Huang et al. | | 99/348 |
| 2004/0247762 A1* | 12/2004 | Xu et al. | | 426/523 |
| 2005/0011370 A1* | 1/2005 | Xu et al. | | 99/409 |
| 2005/0132896 A1* | 6/2005 | Seurat Guiochet et al. | | 99/337 |
| 2005/0223906 A1* | 10/2005 | Xu et al. | | 99/348 |
| 2006/0044935 A1* | 3/2006 | Benelli et al. | | 366/145 |
| 2008/0163764 A1* | 7/2008 | Payen et al. | | 99/447 |
| 2009/0020020 A1* | 1/2009 | Rhetat et al. | | 99/337 |
| 2009/0020021 A1* | 1/2009 | Rhetat et al. | | 99/342 |
| 2009/0020538 A1* | 1/2009 | Rhetat et al. | | 220/573.1 |
| 2009/0020539 A1* | 1/2009 | Rhetat et al. | | 220/573.1 |
| 2009/0301311 A1* | 12/2009 | Cartigny et al. | | 99/337 |
| 2010/0000419 A1* | 1/2010 | Payen et al. | | 99/408 |
| 2010/0303986 A1* | 12/2010 | De'Longhi | | 426/438 |
| 2011/0126719 A1* | 6/2011 | Valance | | 99/340 |
| 2011/0147365 A1* | 6/2011 | Pellerin et al. | | 219/440 |
| 2011/0185917 A1* | 8/2011 | Goderiaux et al. | | 99/348 |

FOREIGN PATENT DOCUMENTS

| | | |
|---|---|---|
| DE | 2127758 | 12/1972 |
| DE | 2412835 | 9/1975 |
| DE | 4125057 | 2/1993 |
| DE | 20214744 U1 | 3/2004 |
| EP | 0168359 | 1/1986 |
| EP | 0213074 | 3/1987 |
| EP | 0591510 | 4/1994 |
| FR | 1236019 | 7/1960 |
| WO | WO 83/03043 | 9/1983 |

* cited by examiner

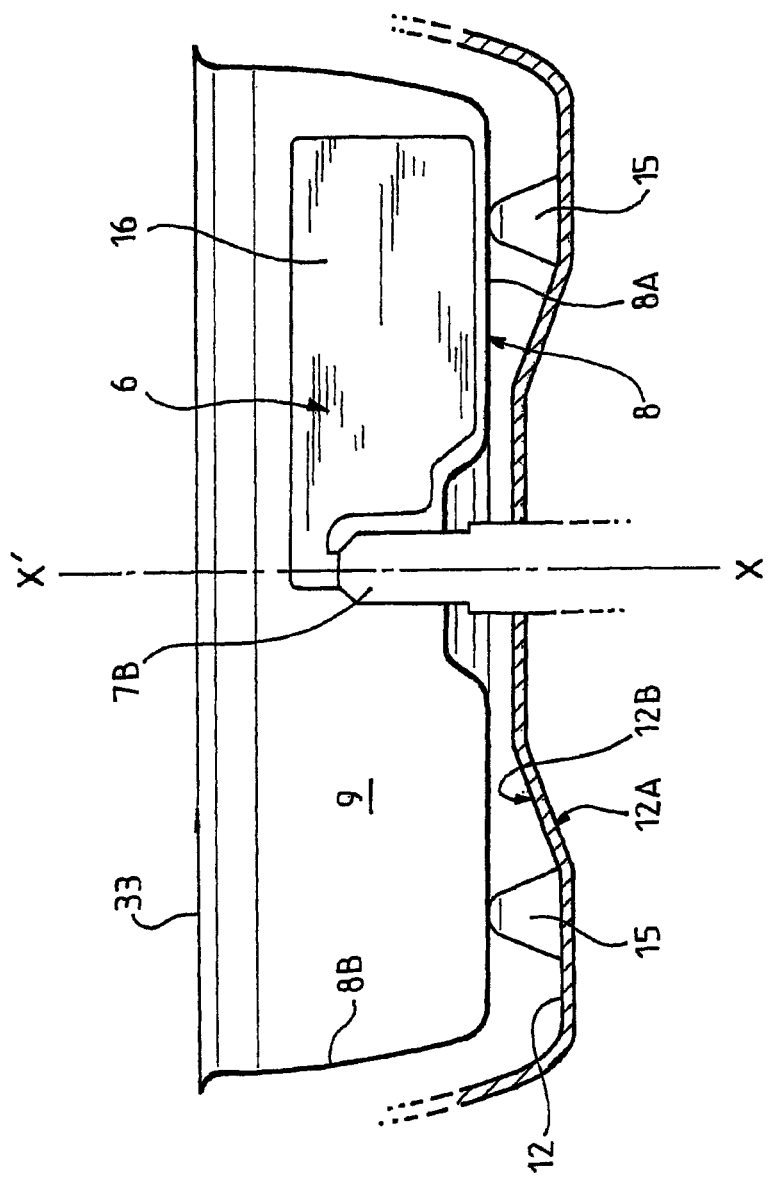

FRYER WITH AUTOMATIC COATING OF FAT

PRIORITY CLAIM

This patent application is a U.S. National Phase of International Application No. PCT/FR2005/001415, filed Jun. 8, 2005, which claims priority to French Patent Application No. 0406214, filed Jun. 8, 2004, the disclosures of which are incorporated herein by reference in their entirety.

FIELD OF THE INVENTION

The present invention relates to cooking appliances for food, in particular domestic appliances of the fryer type and designed for frying food using fats.

The present invention relates to a fryer comprising a main body intended to accommodate food for frying within it.

The present invention also relates to a method of frying food.

BACKGROUND OF THE INVENTION

Frying food such as potato pieces using a domestic electric fryer is well known in the art. Conventionally, such a domestic electric fryer comprises a container intended to be filled with oil or fat, and heater means to heat the contents of the container.

Known electric fryers use a high temperature bath of oil or melted fat in which the food to be fried is immersed, with the help of a cooking basket, for example.

However, that conventional mode of frying by immersion in a hot oil bath, while being generally satisfactory, suffers from several disadvantages.

Firstly, such conventional fryers use a large quantity of oil to produce the cooking bath. This causes difficulties for the user during fryer filling operations, when moving it, and above all when emptying it.

There is also a risk of burns associated with such high-temperature cooking baths, either by spattering out of the appliance container, or if the user does not handle the appliance container correctly (tipping the appliance over). That risk of burns or accidents is exacerbated by the fact that such a large quantity of oil has to be pre-heated for a relatively long period before the food to be fried can be introduced. This may lead the user to forget that the oil is being pre-heated, and the consequences of such an oversight can be disastrous.

Further, such known fryers are relatively expensive to run since a large quantity of oil has to be purchased regularly (a minimum of 1.5 liters (L) to 2 L of oil is generally necessary to fry 1 kilogram (kg) of fresh potato pieces). Thus, the user will naturally be tempted to save on oil by re-using the oil a number of times, which is unsatisfactory from the viewpoints of hygiene and taste. Further, the user may re-use the oil when the oil has degraded, which may be deleterious to health. When the user discards the spent oil, this may have damaging environmental consequences.

Finally, heating such a quantity of oil to high temperatures releases odors which may be particularly disagreeable, and also may polymerize the oil, rendering cleaning of the appliance difficult and stressful.

Ready-to-use food products known as "oven fries" are also known, which consist of pieces of pre-cooked potato pre-impregnated with oil intended for oven cooking without the need to immerse them in oil.

The taste qualities of "oven fries" are generally considered to be mediocre and in all cases far below that of fries cooked by immersion in oil, which generally have a soft core surrounded by a crisp envelope.

Furthermore, "oven" cooking requires the use of pre-prepared products which, in essence, do not have organoleptic qualities that are as attractive as that of fresh food.

SUMMARY OF THE INVENTION

As a result, a feature provided by the invention is to remedy the various disadvantages mentioned above and to propose a novel fryer and a novel frying method which are particularly hygienic, safe, and economic in use, as well as easy to use and maintain, while allowing the user great freedom in the choice of food to be fried.

Another feature of the invention is to propose a novel fryer and a novel frying method which are particularly simple and reliable in design.

Another feature of the invention is to propose a novel fryer and a novel frying method which can produce a particularly homogeneous and attractive taste and coloration of the fried food.

Another feature of the invention is to propose a novel fryer and a novel frying method which can procure an optimum result regardless of the size and quantity of the food to be fried.

Another feature of the invention is to propose a novel fryer and a novel frying method which substantially do not affect the integrity and shape of the food.

Another feature of the invention is to propose a novel fryer and a novel frying method which, as regards maintenance and cleaning, require only particularly simple, rapid operations which can easily be carried out after each cooking session.

Another feature of the invention is to propose a novel fryer and a novel frying method which allow the user to precisely control the quantity and quality of the fat used for cooking.

Another feature of the invention is to propose a novel fryer and a novel frying method the use and implementation of which require only a minimum of interventions by the user.

Another feature of the invention is to propose a novel fryer and a novel frying method which can cook food rapidly.

Another feature of the invention is to propose a novel fryer and a novel frying method which can provide an excellent food cooking quality even when the dimensions of the food vary widely.

A further feature provided by the invention is to propose a novel fryer and a novel frying method which are economic as regards energy consumption while producing fried products with excellent appearance and texture.

The above features of the invention are achieved by means of a dry fryer comprising a main body intended to accommodate food to be fried and, mounted within the main body, a means for automatically coating the food with a film of fat by mingling the food with the fat.

The features of the invention are also achieved by means of a method of frying food by dry frying comprising a coating step in which the food is coated with a film of fat, the coating step being carried out automatically by mingling the food with the fat.

BRIEF DESCRIPTION OF THE DRAWINGS

Other features and advantages of the invention become apparent from the following description, made with reference to the accompanying drawings, given purely by way of non-limiting illustration and in which:

FIG. 6 is a fragmentary side view in section showing a fryer constituting a second exemplary embodiment of the invention.

DESCRIPTION OF THE INVENTION

The fryer 1 shown in FIGS. 1-5 is an electric fryer designed and dimensioned for domestic use. However, the invention is not limited to household use, and may also relate to semi-professional or professional fryers.

The domestic fryer 1 shown in the figures is preferably designed and dimensioned to fry particulate food such as potato pieces, to produce fries. These potato pieces may have been cut manually by the user, or they may have been prepared commercially, either frozen or fresh. The fryer 1 of the invention is not, however, limited to the production of potato fries and may be used to fry other types of food (meat, fish, vegetables, etc.) without departing from the scope of the invention.

The fryer of the invention is a dry fryer. The term "dry frying" as used here means a mode of cooking food without immersing the food in oil or fat, either partially and/or temporarily during the cooking cycle. On the contrary, "dry frying" means cooking in which the food, although "wetted" by a cooking medium (for example, oil), is not immersed in or swimming in that medium. Thus, the principle by which the fryer of the invention functions is different from that of a conventional deep fat fryer.

The fryer 1 of the invention comprises, in conventional manner, a main body 2 intended to accommodate food to be fried (not shown).

Figure 1:
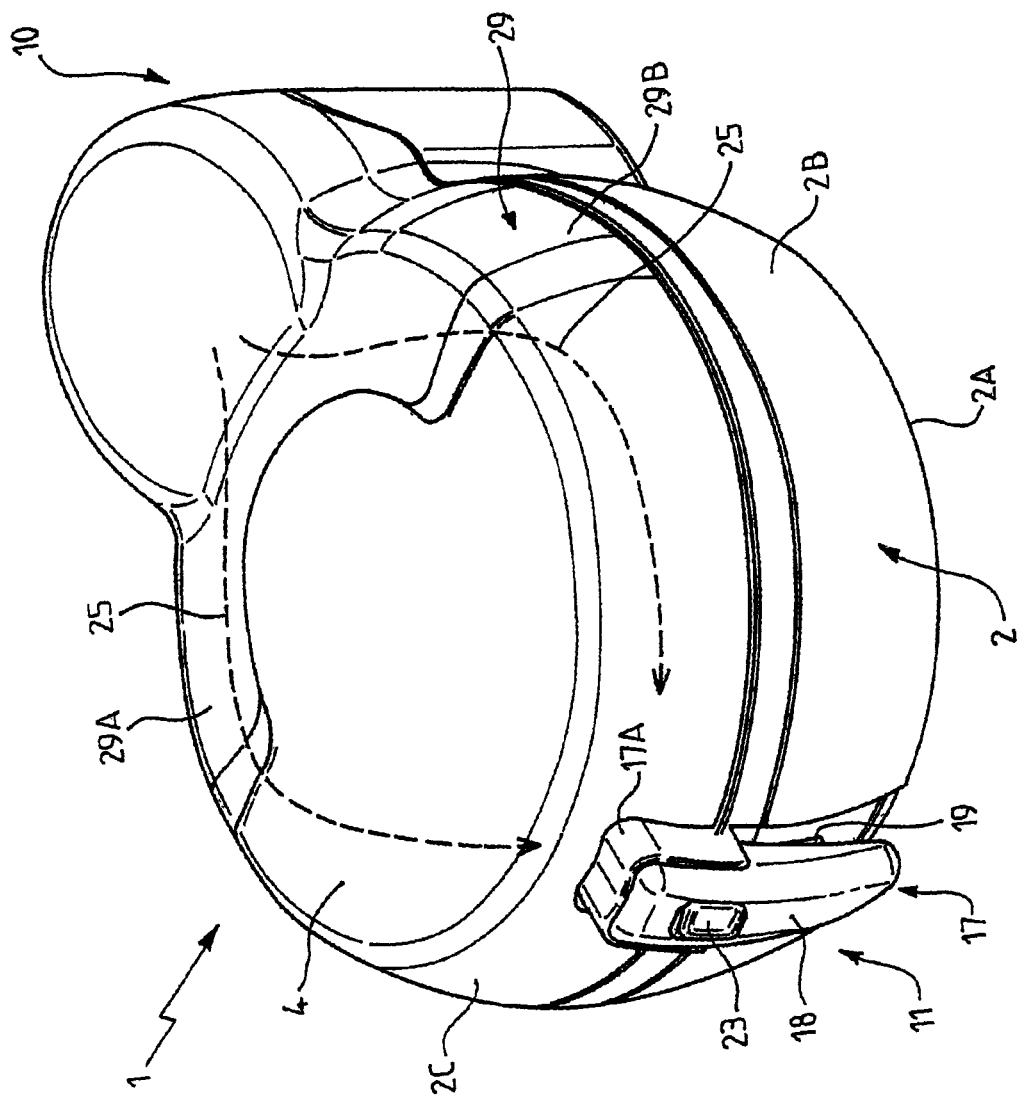
FIG. 1 is a general perspective view showing a fryer in accordance with a first exemplary embodiment of the invention.
Figure 2:
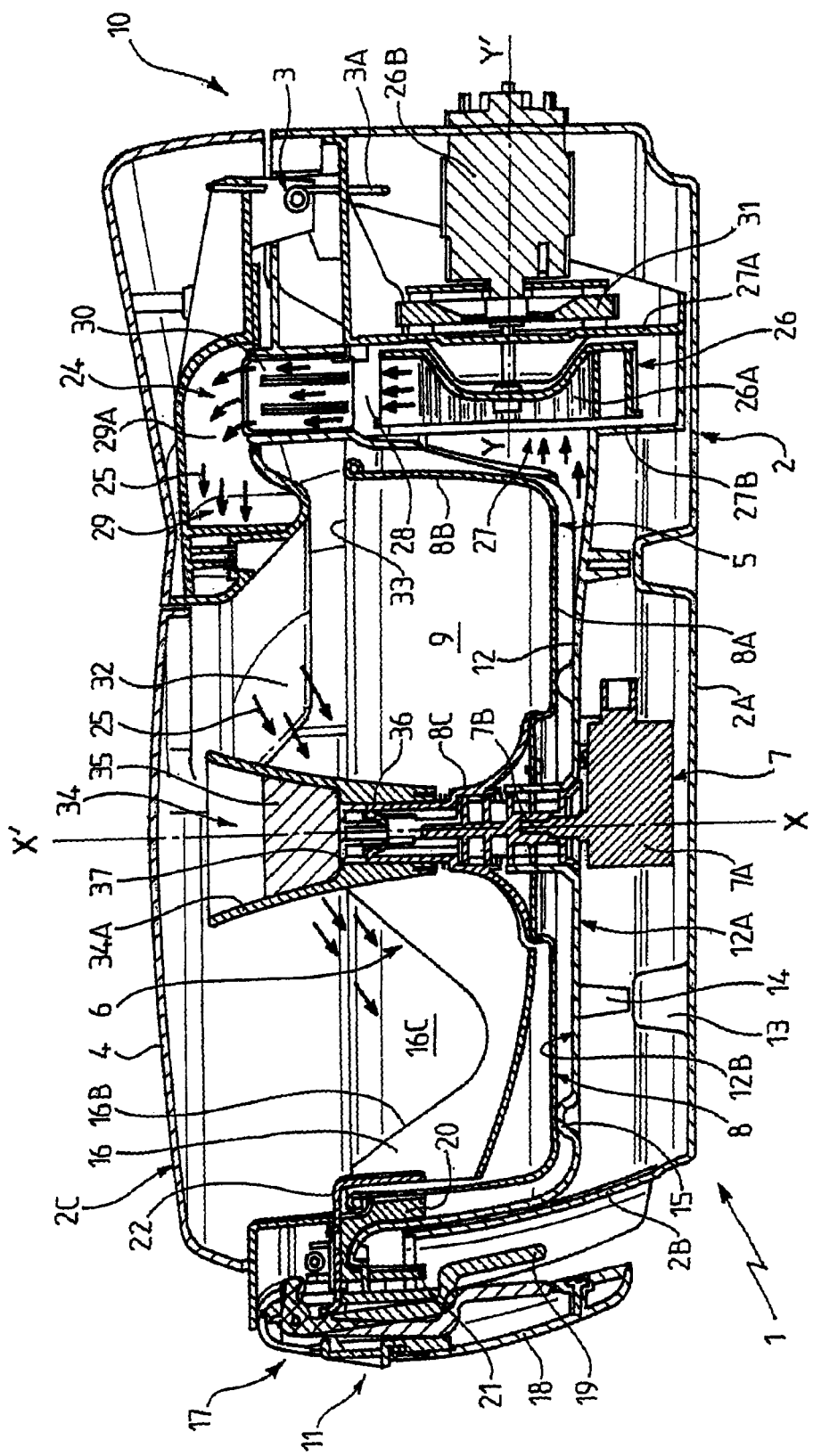
FIG. 2 is a side view in cross section showing the FIG. 1 fryer.
Figure 3:
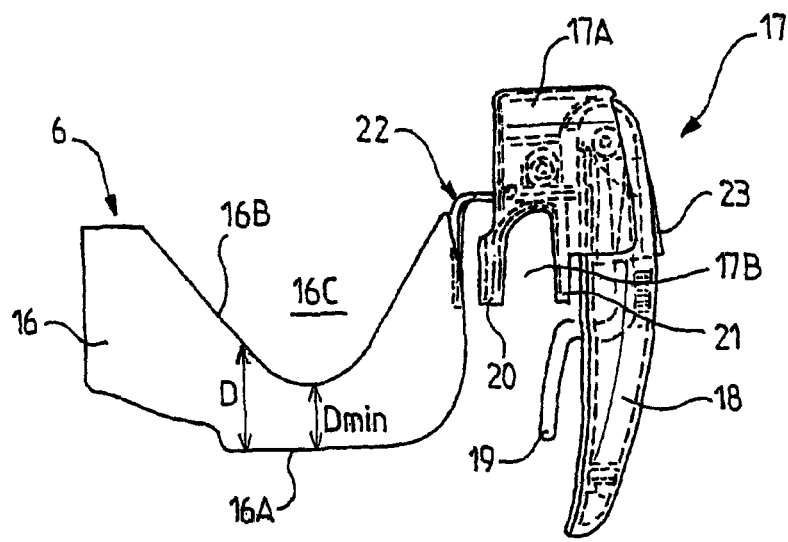
FIG. 3 is a side view showing a blade-handle sub-assembly forming part of the fryer of FIGS. 1 and 2.
Figure 4:
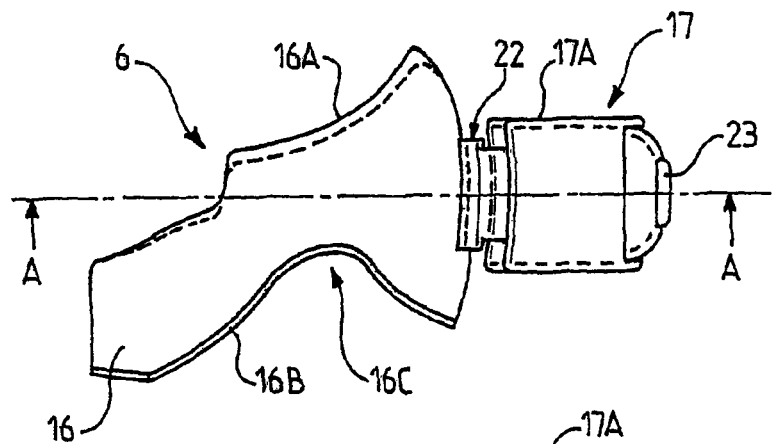
FIG. 4 is a top view showing the sub-assembly of FIG. 3.
Figure 5:
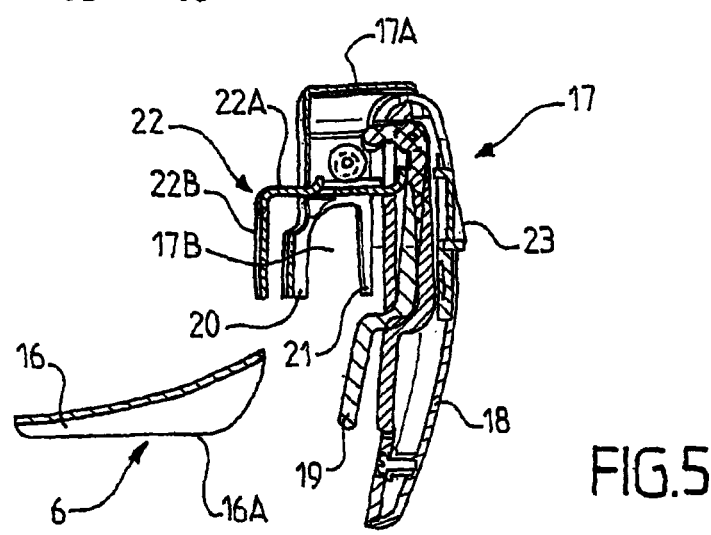
FIG. 5 is a side view in cross section showing the sub-assembly of FIGS. 3 and 4.

As can be seen in FIGS. 1 and 2, the main body 2 comprises a base 2A intended to form a footing for the fryer 1, and shaped to rest in a stable manner on a horizontal surface or support.

Starting from the base 2A and at its periphery is a side skirt 2B formed, for example, from metal or from plastics material and forming the outer envelope of the fryer 1. The side skirt 2B may have any appropriate and pleasing geometrical shape. As an example, in the fryer shown in FIG. 1, the overall shape of the side skirt 2B, viewed from above, is that of the number "8", the top of the number "8" defining the back 10 of the fryer 1 while the bottom of the number "8" defines the front 11 of said fryer 1.

Advantageously, the main body 2 is provided with a lid 2C movably mounted between a closed position (shown in FIG. 1) in which the lid 2C together with the main body 2 form a substantially sealed chamber around the food to be fried, and an open position (not shown) allowing food to be fried to be introduced into the main body 2. In other words, the lid 2C forms a closed box in cooperation with the side skirt 2B and the base 2A, which is preferably substantially hermetically sealed, allowing cooking to be carried out in a closed atmosphere. The substantially leaktight seal of the main body 2 by the lid 2C may, for example, be achieved using seals (not shown in the figures).

As can be seen in FIGS. 1 and 2, the lid 2C is advantageously mounted on the main body 2 by a pivotal resilient connection produced by a hinge 3 provided with a torsion spring 3A so that the open position of the lid 2C is also a return position. Said hinge 3 is also preferably positioned at the periphery of the appliance close to the back 10 of the fryer 1, as can be seen in FIG. 2.

Advantageously and as shown in FIG. 1, the lid 2C may be provided with a transparent viewing zone 4 to allow frying progress inside the appliance to be viewed during the cooking cycle while the lid 2C is closed on the main body 2.

In accordance with a major feature of the invention, the fryer 1 comprises, mounted in the main body 2, a means for automatically coating food to be fried with a film of fat by mingling said food with the fat.

In other words, in contrast to prior art devices where the food is immersed in oil, the invention is based on the principle of frying carried out simply by coating the surface of the food with a thin layer of oil or any other suitable food grade fat. Thus, cooking is not carried out in a bath of oil, which implies the presence of a large quantity of fat surrounding all or part of the food, but because a small quantity of oil forms a thin substantially homogeneous coating on the surface of each piece of food placed in the main body 2.

As already mentioned, the fat is coated automatically, i.e., without the need for direct and essential contribution by the user, to produce the film of fat on the food surface. In other words, because of the presence inside the main body 2 of a means for automatically coating the food with a film of fat, the user needs only to introduce the food to the fryer 1 in the main body 2, and then to activate operation of the automatic coating means (if said activation is not itself automatic) for the fryer to start directly and individually coating the food pieces with a fine layer of fat inside the main body 2 without the user having to carry out that operation personally and manually.

The term "mingling" relates to the action of mingling, i.e., "stirring with mixing". Within the context of the invention, the food is thus coated by combining food and fat and mingling them to cover the food with a film of fat.

The mingling action employed in the context of the invention preferably involves turning the food and the fat, turning can, for example, be carried out by lifting the pieces of food and turning them over.

Advantageously, the means for automatically coating the food with a film of fat comprises a receiver means 5 designed to contain, preferably directly, both the food for frying and the fat, in particular when the fat is in the liquid form (oil or melted fat), and a means 6 for stirring food contained in the receiver means 5.

Thus, the mingling function is preferably obtained by cooperation of the stirrer means 6 which in particular contributes to providing the food and fat with a three-dimensional mixing type motion, and also of the receiver means 5, which keeps the food in a predetermined zone of the appliance.

Advantageously, the receiver means 5 is a bloc, i.e., the receiver means has a unitary character and is preferably formed from a single piece. Preferably, in order to fulfill its function of containing food and fat, the receiver means 5 is also non-perforated, and so differs from a basket, to prevent any loss of fat.

In other words, the receiver means 5 is preferably substantially sealed against liquid or semi liquid materials.

Advantageously, the receiver means 5 and the stirrer means 6 are distinct.

In accordance with the invention, the receiver means 5 and the stirrer means 6 are designed to be moved with respect to each other, to mingle and stir the food and the fat inside the receiver means 5, to coat substantially every piece of food with a substantially uniform, homogeneous, and continuous film of fat.

Advantageously, the stirrer means 6 is mounted in a stationary position relative to the main body 2, while the receiver means 5 is mounted in rotation relative to the main body 2 and to the stirrer means 6, and is also functionally connected to a motor means 7 to be driven in rotation thereby.

This construction corresponds to that employed in the fryer 1 in accordance with the first variation shown in FIGS. 1-5, and which will be described below.

However, without departing from the scope of the invention, it can be envisaged that the fryer 1 may use a stirrer means 6 movably mounted relative to the main body and to the receiver means 5, the receiver means 5 then being mounted in a stationary position in the main body (in the second variation shown in FIG. 6) or the receiver means 5 may be movably mounted in said main body.

Thus, in the second variation shown in FIG. 6, the receiver means 5 is preferably mounted in a stationary position relative to the main body 2 while the stirrer means 6 is mounted in rotation relative to the receiver means 5, and is also functionally connected to a motor means 7 to be driven in rotation thereby.

Advantageously, the receiver means 5 comprises a receptacle 8 defining an inner volume 9 intended to accommodate and contain both food and fat, even when the fat is a liquid (an oil, for example) or a semi-liquid (high viscosity melted fat, for example).

Advantageously, the receptacle 1 is removably mounted on the main body 2.

Preferably, the receptacle 8 has a receptacle bottom 8A, preferably substantially flat and smooth, the inner and outer periphery of which respectively rise into an outer side wall 8B and an inner side wall 8C, so that the receptacle 8 substantially has the general shape of an annular channel with substantially circular symmetry about a vertical axis X-X'. In other words, the receptacle 8 generally has a toroidal shape, generated by rotating a substantially U-shaped open profile about the axis of symmetry X-X'.

Other receptacle shapes may be envisaged, of course. As an example, as can be seen in FIG. 6, the bottom 8A may have a disk shape, with its periphery rising into an annular side wall 8B.

Preferably, the bottom 8A and/or the inner and outer side walls 8B, 8C are substantially solid, i.e., non-perforated, at least in the interface zone with the food and the fat, in order to avoid leakage of fat from the receptacle 8. Preferably, the bottom is completely solid, while the side walls 8B, 8C are solid at least over their lower portions, i.e., close to their connections with the bottom 8A.

Preferably, the receptacle 8 defines an open volume 9, i.e., defined solely by the bottom 8A and the inner and outer side walls 8B, 8C without the lid element disposed opposite the bottom 8A.

In the first exemplary embodiment of FIGS. 1-5, the receptacle 8 is driven in rotation using a first electric motor 7A forming the motor means 7, said first electric motor 7A being provided with an output shaft 7B extending substantially coaxially with the axis X-X', and fixed to the inner side wall 8C. More precisely, the output shaft 7B is mounted, preferably removably, in the sleeve formed by the inner side wall 8C.

In a second exemplary embodiment, shown in FIG. 6, the receptacle 8 is independent of the shaft 7B, which is fixed to the stirrer means 6 to drive said stirrer means 6 in rotation about the axis X-X'. In this variation, an orifice is provided in the bottom 8A to allow the shaft 7B to pass and rotate.

In the examples shown in FIGS. 2 and 6, the first electric motor 7A is installed in a housing defined in the direction of the axis X-X' by a base 2A and also by a casing 12. Said casing 12 has an inner face 12A located facing the first electric motor 7A and an opposite outer face 12B. The inner face 12A of the casing 12 is spaced from the base 2A by spaces preferably formed by lugs 13, 14 which bear on one another, projecting respectively from the base 2A and from the inner face 12A of the casing 12.

Preferably, as can be seen in FIGS. 2 and 6, bosses 15 project from the outer face 12B of the casing 12, said bosses acting, as in the variation of FIG. 2, as sliding bearing means for the receptacle 8 and as a simple bearing means for the receptacle 8 in the case of the variation of FIG. 6.

Preferably, the stirrer means 6 also comprises a blade 16 disposed in the inner volume 9 defined by the receptacle 8, to form, in the variation of FIG. 2, a substantially stationary obstacle to food which is moved by rotation of the receptacle 8. Once the food and fat have been (manually and/or automatically) disposed in the receptacle 8, the receptacle is rotated by means of the first electric motor 7A which causes a generally circular displacement of food and fat about the axis X-X', until the food encounters the obstacle formed in this case by the blade, which obstacle contributes to turning and mingling the food and fat, thereby coating the food rapidly and substantially uniformly.

In the variation shown in FIG. 6, in contrast, it is the blade 16 which, when rotated in the receptacle 8 in the inner volume 9, actively displaces the food and fat to coat said food.

In order to optimize, as regards uniformity and rapidity, coating of the food with a film of fat, the blade 16 used in the variation of FIG. 2 is preferably shaped as follows:

firstly, from a lower edge 16A located substantially at the bottom 8A of the receptacle 8, the blade rises to an upper edge 16B, the blade 16 having a V-shaped cut-out opening 16C substantially at said upper edge 16B; and secondly, the blade extends laterally substantially from the outer side wall 8B to the side wall 8C.

In other words, in the variation of FIG. 2, the blade 16 forms an obstacle with height D that varies in the radial direction defined with respect to the axis of symmetry X-X'. Thus, this height D is a maximum in the region of the lateral ends respectively defined by the outer side wall 8B and the inner side wall 8C, the height D decreasing regularly from the outer side wall 8B and from the inner side wall 8C to a minimum $D_{min}$ (point of the "V") corresponding, for example, substantially to the center of the distance separating said outer 8B and inner 8C side walls.

This disposition renders the blade 16 universal in nature and the blade can thus turn and mingle food regardless of its quantity and size within the dimensional limits of the fryer 1.

In particular, for a small quantity of food, the low center (point of the "V") of the blade 16 is dimensioned so that sufficient mingling is carried out to correctly coat the food with fat.

Preferably, to facilitate operation of the blade 16, the lower edge 16A of the blade is curved inwardly to guide food towards the upper edge 16B when the receptacle 8 is rotated.

Advantageously, the lower edge 16A of the blade is also beveled, and is inclined obliquely relative to the path of food in the horizontal plane (see FIG. 4) to allow the food to skim over the blade 16.

Preferably, the blade is also generally inclined, in the manner of a ski jump, relative to the axis X-X, to facilitate engagement of the food without damaging it.

The blade 16 is preferably produced from a material with good slip properties. The blade may advantageously be coated with a non-stick material, for example, polytetrafluoroethylene (PTFE), or the blade may be produced from stainless steel or polyamide 4-6.

The bottom of the receptacle 8 advantageously has protuberant profiles which may act as an abutment for food to be fried to allow the blade 16, cooperating with said profiles, to lift said food instead of simply pushing the food round the receptacle 8.

Advantageously, the blade 16 is also removably mounted on the main body 2.

To this end, in the non-limiting context of the variation shown in FIG. 2, the blade 16 is fixed (removably or otherwise) to a handle 17 so that the blade 16 and the handle 17 form an independent unitary sub-assembly that can be removably mounted on the main body 2.

The handle 17 preferably includes a docking part 17A provided with a notch 17B extending between a front face 20 and a back face 21 to form a bracket substantially in the shape of an upturned "U".

This bracket is shaped to rest on a complementary receiving part fixed to the main body 2 of the fryer 1. When the handle rests on the main body 2, the front face 20 is interposed between the outer side wall 8B of the receptacle 8 and the side skirt 2B, or more precisely, as shown in FIG. 2, between the outer side wall 8B and the casing 12.

The handle 17 also comprises a clamping tab 22 which is "L" shaped, a first arm 22A of the "L" being radially slidably mounted (i.e., perpendicularly to the axis X-X') on the part 17A, while the second arm 22B is perpendicular to the first and extends substantially downwardly parallel to the front face 20.

Advantageously, the blade 16 is securely mounted on the clamping tab 22.

When the handle 17 is positioned on the main body 2, the outer side face 8B of the receptacle 8 is interposed between the front face 20 and the clamping tab 22, which supports the blade 16.

The handle 17 also comprises a manual grip member 18 pivotally mounted on the part 17A between a cooking position in which the manual grip member 18 extends substantially parallel to the skirt 2B and the axis X-X', and a position for removing the receptacle 8 in which the manual grip member 18 extends substantially horizontally, i.e., substantially perpendicularly to the axis X-X'.

When the manual grip member 18 is in the horizontal extraction position, by actuating a gripping lever 19 mounted to pivot coaxially with the grip member 18, the user may act on the clamping tab 22 to pinch the outer side wall 8B of the receptacle 8, by bringing the clamping tab 22 towards the front face 20. The user can thus simultaneously remove the receptacle 8 (when the receptacle is removable) and the blade 16 using the handle 17, which can be disengaged from the receptacle 8.

Preferably, the handle 17 is provided with a locking/unlocking system 23 mounted on the manual grip member 18 and arranged to automatically lock the manual grip member 18 in the removal position. By acting on this locking/unlocking means 23, the user may then unlock the grip member 18 to free the receptacle 8 and bring the grip member 18 into the cooking position.

The fat-coated food may be heated in the fryer 1 using any known internal (i.e., integrated into the fryer 1) or external (i.e., independent of the fryer 1) heater means provided that these heater means are designed and dimensioned to provide excellent heat exchange with the food, which is all the more important since cooking is not carried out in an oil bath but simply with a coating of oil.

Advantageously, the fryer 1 includes, mounted on the main body 2, a main heater means 24 provided to generate a flow of heat 25 which is orientated to strike at least part of the food in the main body 2 substantially directly.

The term "main heater means" denotes a heater means which can of itself provide at least the major part of the heat for cooking. Preferably, the main heater means 24 is designed and arranged to supply all of the heat.

The term "flow of heat" as used here denotes a directional stream of heat with a positively controlled dynamic character in contrast, for example, to a simple natural convection effect which can be obtained by purely static heating.

Because the flow of heat 25 is directed to be exerted directly without an intervening medium (such as the bottom of a receptacle, for example) onto the food present in the receptacle 8, this contributes to excellent heat exchange and, by cooperating with the film of oil present on the food, cooks in a manner which is substantially equivalent to that obtained in an oil bath but without the disadvantages of a bath.

Advantageously, the flow of heat 25 is a flow of hot air. However, the invention is not limited to a flow of hot air, and it is possible to envisage the flow of heat emanating from infrared heating, for example. Hot air heating is preferred, however, at least in the exemplary embodiment shown in the figures, since hot air heating produces better results compared with infrared heating, especially with food that has been cut up manually and has pieces of varying sizes and thicknesses.

Advantageously, the flow of hot air 25 is directed substantially towards the stirrer means, in this case the blade 16. Because it functions as an obstacle, the blade 16 will contribute to aggregating close to it the major portion if not all of the food present in the receptacle 8. Thus, it is sufficient to orientate the flow of hot air 25 towards the blade 16 to heat the food in an optimal manner without needing to heat the whole of the receptacle 8 uniformly. The combination of a blade 16 and a localized flow of hot air 25 is particularly advantageous as regards cooking efficiency, energy saving, and simplicity of design.

Advantageously, the hot air flow 25 is a recycled flow, i.e., the fryer 1 operates in a substantially closed environment, the air present inside the main body 2 being removed for heating and then propelled onto the food. Said propelled hot air cools in contact with the food and is removed again for reheating, and so on.

Advantageously, the main heater means 24 includes a centrifugal fan 26 generating an air flow by taking air from the main body 2 via at least one inlet vent 27, preferably arranged laterally with respect to the receptacle 8, and then discharging that air via at least one outlet vent 28 in a ducting device 29 which opens in the direction of and above the food present in the main body 2.

A filter may be provided at the inlet to the centrifugal fan 26, for example, in the region of the inlet vent 27. Said inlet vent 27 is advantageously arranged behind the side wall of the receptacle 8 and can capture air present close to the periphery of said receptacle 8 by suction around said receptacle 8.

Advantageously, the main heater means 24 also includes a heater element 30 positioned in the air flow, preferably downstream of the outlet vent 28 in the direction of the flow, to transform the air flow into a flow of heat 25.

Advantageously, the heater element 30 comprises a system of electrical resistors with resistive strips and/or resistive wires held on an insulating support, which turns out to be an economic solution as regards positioning and also performs well as regards yield. Preferably, the resistive strips and/or resistive wires are placed in the air flow as a function of the distribution of the air speeds in the flow to prevent hot spots. The power of this system of electrical resistors is also determined to ensure rapid heating of the food without drying the food out. Preferably, said power is substantially in the range 1000 watts (W) to 2000 W, more preferably in the range 1200 W to 1400 W.

Preferably, the centrifugal fan 26 comprises an impeller 26A which is driven in rotation about an axis Y-Y' substantially perpendicular to the axis X-X', by a second electric motor 26B. The impeller 26A is preferably inserted in a volute formed by a rear side plate 27A fixed to a front side plate 27B, said front side plate 27B preferably forming part of the casing 12. The rear side plate 27A, cooperating with the side skirt 2B, thus forms a substantially closed housing for the second electric motor 26B which preferably drives a fan wheel 31 positioned inside the housing for the motor 26B and serving to cool said motor 26B.

Advantageously, the flow of heat meets the food at a glancing angle (i.e., less than 45°). This technical disposition means that the ducting device can be arranged laterally in the appliance. This lateral guidance of hot air means that the lid can be lighter and that handling the appliance is easier while proper cooking is continued. Cleaning is also facilitated, as well as removal or positioning the cooking receptacle 8.

Advantageously, the ducting device 29 comprises two ducts 29A, 29B extending in the form of a Y at the periphery of the fryer 1 and both starting substantially at the region of the heater element 30 or downstream therefrom in the direction of flow.

Preferably, the ducts 29A, 29B are mounted in the lid 2C and each terminates, in the direction of flow 25, in a nozzle 32 orientated obliquely relative to the axis X-X' towards the front 11 and bottom of the fryer 1. The highest air temperature will preferably be found close to said nozzles 32, facing them.

In this configuration, the heating air flow 25 comprises two distinct jets which converge substantially symmetrically towards the blade 16. These two jets converging from opposite directions contribute to excellent heat exchange with the food since at their meeting point they generate and/or encourage the appearance of turbulence which is favorable to heat transmission.

Causing two flows of hot air to meet at the food is advantageous to cooking since using two flows of hot air can reduce the temperature gradient, moisture, and oil aerosol concentration compared with using a single flow. This meeting of the flows can thus produce better diffusion of heat, which improves cooking.

However, it is clear that the invention is not limited to a particular number of jets of fluid and it is entirely possible for the flow of hot air 25 to comprise a single jet or more than two jets.

In particular, the invention relates independently to a fryer comprising at least two hot air jets converging on each other and directed at an oblique angle onto the food to be cooked.

Advantageously, the assembly of the air circuit (which in particular comprises the fan 26, the heater element 30 and the ducting device 29) is designed and dimensioned so that the hot air flow 25 arrives at the food contained in the receptacle 8 at a speed which is substantially above 2 meters per second (m/s), preferably substantially 3 m/s or more. The choice of such a minimum speed ensures optimum cooking, encouraging the creation, on the food surface, of a crisp envelope without drying out the surface, and cooking of the core of the food, to keep a soft consistency.

Advantageously, the air circuit assembly is designed so that the temperature of the hot air flow 25 is substantially less than 200° C. in the region of the food, preferably less than 180° C. in the region of the food. A temperature which is substantially higher than the limits mentioned above is the origin of bad odors and does not provide any significant gain in cooking time.

Preferably, the centrifugal fan 26 and the blade 16 are positioned substantially opposite each other with respect to the center of the fryer 1 which is in fact the axis X-X'. More particularly, the fan 26 is advantageously positioned at the back 10 of the appliance while the blade 16 is located at the front 1 of the appliance. This disposition maximizes the length of the air flow generated by the fan 26, contributing to ensuring a good yield on cooking. This characteristic can be further improved by positioning the inlet vent 27 at a position below that of the upper edge 33 of the receptacle 8.

In order to further improve the cooking qualities of the fryer 1 of the invention, it is advantageous to provide the inner face of the receptacle 8, which is intended to face the food, with a coating based on a material mainly comprising silicone. In particular, it is advantageous to cover the bottom 8A of the receptacle 8 with a coating of silicone since the microporous qualities of silicone provides specific qualities regarding reaction with fat (emulsion), to produce a better distribution of oil on the food, while maintaining an excellent coefficient of friction, which is useful as regards keeping the food together when coating by mingling.

Further, such a silicone receptacle can heat the fries with which the silicone receptacle comes into contact without burning them or over-coloring them as a metal receptacle would do, for example. The Applicant has established that the conduction transfer properties between fries and a silicone receptacle are substantially comparable with the properties of transfer by forced hot air conduction onto the fries. With said silicone coating, uniformity of cooking is ensured, in particular by avoiding browning the tips of the fries.

It is also possible to coat all or part of the inner face of the receptacle 8 with a material mainly constituted by polytetrafluoroethylene (PTFE), a material which has excellent thermal and tribological properties.

The receptacle 8 may, however, simply be produced from stainless steel without a particular surface treatment.

Advantageously, the fryer 1 of the invention forms, when operating (i.e., when the lid 2C is closed), a substantially closed cooking chamber around the receiver means 5, i.e., preferably closed in a sealed manner, said chamber preferably being provided with a calibrated steam-releasing means (not shown).

This measure can control the humidity prevailing in the chamber.

To this end, the calibrated steam-releasing means are dimensioned so that:

pressure cooking is avoided; this would occur if the chamber were to be completely sealed and could cause the fries to break up; and economic energy consumption is encouraged, since if too much steam escapes, this would result in a major dissipation of energy, which would mean that the heater element 30 would have to be over-dimensioned.

Preferably, the calibrated steam-releasing means comprises a venting orifice (not shown), preferably disposed close to the inlet vent 27 of the fan 26, which allows controlled continuous evacuation of steam throughout the cooking cycle and controlled renewal of the air inside the chamber.

Advantageously, the fryer 1 includes a means 34 for storing fat 35 which is distinct from the receiver means 5 (i.e., the receptacle 8 in this case) and which is functionally connected to said receiver means 5 to supply the receiver means 5 with fat 35, which preferably is in the liquid (or melted) form.

Advantageously, the distinct storage means 34 includes a discharge orifice 36 provided with a blocking means 37, said storage means 34 being capable of being in a closed return configuration (shown in FIG. 2) in which the fat 35 is maintained by the blocking means 37 in the storage means 34, and in an open configuration (not shown), in which the blocking means allows the fat 35 to discharge via the orifice 36 from the storage means 34 to the receiver means 5, in this case the receptacle 8.

Advantageously, the storage means 34 comprises a goblet 34A provided at its bottom with a mouth forming a discharge orifice 36, the blocking means 37 comprising a pin with a divergent head which is fixed to the receiver means 5 and inserted into the mouth. The goblet 34A is slidably elastically mounted with respect to the pin between a first position corresponding to the open configuration of the storage means and a second position corresponding to the closed return configuration of the storage means 34. The pin is fixedly mounted in position in the main body 2.

Such a goblet, which may optionally be graduated, allows the user to control precisely the quantity of oil which is introduced into the fryer, which saves fat while encouraging a healthy cooking style.

Advantageously, the storage means 34, in this case the goblet 34A, is mounted on the receiver means 5 so that the storage means 34 is in the open configuration, the fat 35 discharging directly into the receiver means 5. To this end, the goblet 34A is preferably mounted coaxially with the axis X-X', so that the discharge orifice 36 forms, in collaboration with the pin, an opening in the form of a ring around the pin, to encourage a multi-directional flow of fat 35 over the inner side wall 8C of the receptacle 8.

Advantageously, the lid 2C is functionally connected to the storage means 34 so that the closed position of the lid 2C substantially corresponds to the open position of said storage means 34.

Thus, in the case shown in FIG. 2, the lid 2C, when in the closed position, will press the goblet 34A downwards, which causes a relative movement of the pin with a divergent head 37 of the goblet 34A, allowing the fat 35 to flow.

Preferably, the storage means 34 is removably mounted relative to the main body 2. Advantageously, the storage means 34 is disposable.

Advantageously, the appliance of the invention may include an orifice for filling the storage means 34 when the lid 2C closes the main body 2. This make-up orifice, which may be extended by a conduit is, for example, provided in the lid 2C or, more generally, in the main body 2. This disposition allows fat to be added after cooking has commenced, for example, if it has been forgotten, or to obtain fries which are a little browner.

Alternatively, the fryer 1 need not include the distinct storage means 34. Under such circumstances, the fat may be poured directly by the user onto the food to be cooked, in the receptacle 8.

There follows a description of an example of use of the fryer 1 of the invention. In this example, the user proposes to fry 1 kg of fresh potato pieces which have been cut up manually.

To this end, the user introduces said potato pieces into the receptacle 8. The user also introduces a small quantity of oil (for example, 30 grams (g) or less) into the goblet 34A.

Because only a small amount of oil is employed, the user can use oil of an excellent quality which may be healthier and/or taste better.

The user then closes the lid 2C, which has the effect of pushing the goblet 34A downwards parallel to the axis X-X', causing the oil 35 contained in the goblet to empty into the receptacle 8. Emptying ideally occurs in all directions, which contributes to encouraging rapid coating of the food.

The cooking cycle then begins, causing the receptacle 8 to rotate about the axis X-X' and thus using the fixed blade 16 to mingle the potato pieces and the oil spread in the receptacle. Mingling results in coating a film of oil on the surface of each potato piece. Simultaneously, or possibly after a latent period, the fan 26 and the heater element 30 are started up, establishing a flow of hot air 25 which will directly heat the oil-coated potato pieces. The receptacle 8 thus also acts as a cooking receptacle. Hence, the food is cooked by heating the food directly rather than, as in the prior art, by immersing the food in a bath of hot fat.

In a first stage of the cooking cycle, the fan-driven air heats the upper layer of potato pieces which rapidly produce steam. By condensing on the cooler pieces on the lower layers, this steam acts as a heat exchanger with those pieces in the lower layers. This cooking mechanism in an environment saturated with steam thus allows rapid and homogeneous heating of all of the potato pieces present in the receptacle 8. This homogeneous heating is facilitated by permanent mingling of the pieces, carried out by the rotating receptacle and the blade 16 (variation of FIG. 2) or by the stationary receptacle 8 and the rotating blade 16 (variation of FIG. 6). In other words, in combination with the turning receptacle and the fixed blade, the streams of hot air directed towards the blade can reach the food in a zone in which they are moving relative to each other, which further enhances cooking uniformity.

The food thus undergoes a cycle of direct heating by the hot air flow, then diffusion/absorption of heat in the food, then again direct heating with the hot air flow, and so on.

Preferably, the rotation rate of the receptacle is less than 10 revolutions per minute (rpm), and more preferably the rotation rate of the receptacle is substantially in the range 2 rpm to 3 rpm.

The pieces are overheated when they are under the direct air flow and they absorb heat when they leave that zone, before being overheated again. This alternation diffuses heat into the food better and contributes to avoiding excessive drying out.

In this first stage of the cycle, then, an equilibrium is produced between evaporation and re-condensation, until the steam has been progressively evacuated from the fryer by the calibrated steam-releasing means.

There then begins a second cooking stage, when the steam has been substantially reduced. During this second stage, the average temperature in the chamber reaches substantially 160° C. (while the temperature was about 100-120° C. during the first stage) and the Maillard reaction (coloration of fries) takes place. During this second stage, mingling the pieces is continued using the blade 16 and rotating the receptacle 8 to homogenize cooking.

The cooking cycle, which will have taken about 30 minutes in total, is then finished. The user may then open the lid 2C and simultaneously remove the receptacle 8 and the blade 16 using the removable handle 17.

The receptacle 8 thus acts as a serving dish and will now contain fries which are ready to serve and have a taste and appearance which are similar to fresh fries cooked in an oil bath.

The fact that the handle 17, which can be used to remove the receptacle 8 and optionally the blade 16 from the main body 2, is disposed opposite to the hot air circuit relative to the center of the appliance, means that the appliance is ergonomic in design.

Independently, the invention thus relates to a fryer comprising a receptacle 8 and a stirrer means 6 which is preferably fixed to a handle 17 to allow the receptacle 8 to be removed from the cooking chamber.

The invention also relates to a method of frying food comprising a coating step in which the food is coated with a film of fat by mingling said food with fat.

The frying method of the invention is a dry cooking method, i.e., the cooking operation proper is not by immersion in a bath of heated fat, not even partial or momentary immersion. The envisaged frying method is thus a method without immersion in a bath of hot fat.

Preferably, the method of the invention is a method of frying particulate food such as potato pieces. Preferably, said method is also a domestic method, i.e., the method can be carried out in its entirety in a non-professional household context.

In accordance with the invention, the coating step is carried out automatically, i.e., without intervention by the user, as already mentioned above.

Advantageously, the method of the invention comprises a step of heating food, the coating and heating steps preferably being carried out substantially simultaneously or at least being carried out using a single appliance, in particular a single receptacle 8 as is described below.

Advantageously, in the coating step, the food and fat are brought into motion and at least one obstacle is placed in their path to stir said food and fat, and thus coat the food with fat.

Preferably, in the coating step, the food and fat are placed in a receptacle 8 which can be rotated to bring the food and the fat into movement, a fixed blade 16 forming a stirrer means 6 being positioned in the receptacle 8 to form an obstacle in the path of the food moved by rotation of the receptacle 8. This is a simple and rapid way of producing a substantially homogeneous and individual coating of fat on pieces of food.

Alternatively, as can be seen in FIG. 6, placing the food and fat in a stationary receptacle can clearly be envisaged, with a rotating blade 16 forming the stirrer means 6 being positioned in the receptacle 8 to move the food in the receptacle 8 under the effect of rotation of said blade 16.

Preferably, in the heating step, a stream of hot air is generated which is orientated so as to strike at least part of the food substantially directly, the stream of hot air preferably being orientated towards the blade 16.

Preferably, the method of the invention is carried out in its entirety in a substantially closed chamber, the method nevertheless and preferably including a step of controlled evacuation of steam contained in the chamber by means of a calibrated steam-releasing means. The calibrated means is advantageously designed to allow a preliminary cooking stage in steam-saturated surroundings, followed by a subsequent browning stage in a drier environment, the majority of the steam created by heating the food at the start of cooking having been progressively and automatically evacuated.

The foregoing envisages a cooking appliance in the form of a fryer.

However, it is entirely possible to envisage the appliance of the invention being used to cook and/or reheat food without frying it, in particular when a non-fat cooking fluid is employed.

It is also possible to envisage using the appliance without adding fat to the receptacle, when fat is already contained in the food (in the case of frozen and/or precooked food, for example).

The invention is capable of industrial application in the design, manufacture and use of a food cooking appliance.

The invention claimed is:

1. A dry fryer, comprising:
   a main body configured to surround food to be fried,
   a coating device mounted within said main body for automatically coating said food with a film of fat by mingling said food with fat, and
   a main heater mounted on the main body and arranged to generate a flow of heat orientated so as to strike substantially directly at least a portion of said food, said main heater by itself providing at least most of the contribution of heat for cooking said food and being distinct from the coating device,
   wherein the coating device comprises
   a receiver comprising a receptacle which is non-perforated, at least in an interface zone with the food and the fat, in order to avoid leakage of fat from the receptacle, and
   a stirrer for stirring food contained in the receptacle, the receptacle and the stirrer being arranged to be moved relative to each other to stir and coat the food with a film of fat.

2. The dry fryer of claim 1, wherein the receptacle is configured to contain both food and fat, the food being mingled with the fat inside said receptacle.

3. The dry fryer of claim 2, wherein the receptacle is mounted in a position that is stationary relative to the main body, while the stirrer is mounted for rotation relative to the receptacle and is connected to a motor to be driven in rotation thereby.

4. The dry fryer of claim 2, wherein the stirrer is mounted in a position that is stationary relative to the main body, while the receptacle is mounted for rotation relative to both the main body and the stirrer, and is connected to a motor to be driven in rotation thereby.

5. The dry fryer of claim 4, wherein the receptacle defines an internal volume for receiving food and fat, the stirrer comprising a blade disposed inside the internal volume to form an obstacle to food moving by rotation of the receptacle.

6. The dry fryer of claim 1, further comprising a fat-storing device which is distinct from the receiver and connected thereto to supply the receiver with fat.

7. The dry fryer of claim 1, wherein the flow of heat is a flow of hot air.

8. The dry fryer of claim 5, wherein the flow of heat is directed substantially towards the blade.

9. The dry fryer of claim 8, wherein the flow of heat comprises at least two distinct jets which converge substantially symmetrically towards the blade.

10. The dry fryer of claim 2, wherein the main body comprises a side skirt rising from a base, the main heater comprises a centrifugal fan positioned laterally relative to the main body, said centrifugal fan generating a flow of air by sucking air from the main body via at least one inlet vent, and discharging it via at least one outlet vent into a ducting device opening in a direction above the food present in the main body, and the main heater also comprises a heater element positioned in the air flow, downstream from the outlet vent, to transform the air flow into a flow of hot air.

11. The dry fryer of claim 10, wherein the stirrer comprises a blade and the centrifugal fan and the blade are positioned substantially opposite each other relative to the center of the fryer.

12. The dry fryer of claim 1, wherein the dry fryer, during operation, forms a substantially sealed cooking chamber provided with a calibrated release of steam.

13. The dry fryer of claim 1, wherein the main body is configured and dimensioned to fry particulate foods optionally comprising potato pieces.

14. The dry fryer of claim 1, wherein the main body is configured and dimensioned for domestic use.

15. The dry fryer of claim 1, wherein the main heater is configured and arranged to supply all of the heat for cooking.

16. A dry fryer comprising a main body configured to surround food to be fried and, mounted within said main body, a coating device for automatically coating said food with a film of fat by mingling said food with fat, said coating device comprising
a receiver which is removably mounted on the main body and configured to contain both food and fat, the food being mingled with the fat inside said receiver, the receiver comprising a receptacle which is non-perforated, at least in an interface zone with the food and the fat, in order to avoid leakage of fat from the receptacle, and
a stirrer for stirring food contained in the receptacle, the receptacle and the stirrer being arranged to be moved relative to each other to stir and coat the food with a film of fat.

17. A dry fryer according to claim 16, wherein the dry fryer forms, during operation, a substantially closed cooking chamber.

18. A dry fryer according to claim 16, wherein the main body is provided with a lid movably mounted between a closed position in which the lid together with the main body form a substantially sealed chamber around the food to be fried, and an open position allowing food to be fried to be introduced into the main body.

19. A dry fryer according to claim 16, wherein said coating device causes a generally circular displacement of food.

20. A dry fryer according to claim 16, wherein said coating device drives the food in rotation about a vertical axis (X-X').

21. A dry fryer according to claim 16, wherein the receptacle is mounted in a position that is stationary relative to the main body, while the stirrer is mounted for rotation relative to the receptacle and is connected to a motor to be driven in rotation thereby.

22. A dry fryer according to claim 16, wherein the stirrer is mounted in a position that is stationary relative to the main body, while the receptacle is mounted for rotation relative to both the main body and the stirrer, and is connected to a motor to be driven in rotation thereby.

23. A dry fryer according to claim 16, further comprising, mounted on the main body, a main heater arranged to generate a flow of heat orientated so as to strike substantially directly at least a portion of the food, the said main heater by itself providing at least most of the contribution of the heat for cooking.

24. A dry fryer according to claim 23, wherein the main heater is housed in the main body.

25. A dry fryer according to claim 23, wherein the main heater is configured and arranged to supply all of the heat for cooking.

26. A dry fryer according to claim 23, wherein the flow of heat is either a flow of hot air or a flow of heat emanating from infrared heating.

27. A dry fryer according to claim 26, wherein the main heater comprises a centrifugal fan generating a flow of air by sucking air from the main body via at least one inlet vent, and discharging it via at least one outlet vent into a ducting device opening in a direction above the food present in the main body, the main heater also comprising a heater element positioned in the air flow, downstream from the outlet vent, to transform the air flow into a flow of hot air.

28. A dry fryer according to claim 16, wherein the dry fryer is configured and dimensioned for domestic use.

29. A dry fryer according to claim 17, wherein the main body is provided with a lid movably mounted between a closed position in which the lid together with the main body form a substantially sealed chamber around the food to be fried, and an open position allowing food to be fried to be introduced into the main body.

30. A dry fryer according to claim 24, wherein the main heater is configured and arranged to supply all of the heat for cooking.

31. A dry fryer according to claim 24, wherein the flow of heat is either a flow of hot air or a flow of heat emanating from infrared heating.

32. A dry fryer according to claim 16, further comprising a handle with a manual grip member, said manual grip member being pivotally mounted between a cooking position in which the manual grip member extends substantially vertically, and a removal position for removing the receiver in which the manual grip member extends substantially horizontally.

33. The dry fryer of claim 32 wherein the handle is provided with a locking/unlocking system mounted on the manual grip member and arranged to automatically lock the manual grip member in its removal position.

34. A dry fryer comprising a main body configured to surround food to be fried; a coating device mounted within the main body for automatically coating said food with a film of fat by mingling the food with fat, the coating device comprising a receiver which is mounted on the main body and configured to contain both food and fat, the food being mingled with the fat inside the receiver; and a holder for fat, dimensioned to contain about 30 grams of fat; wherein the receiver comprises a receptacle which is non-perforated, at least in an interface zone with the food and the fat, in order to avoid leakage of fat from the receptacle, and wherein the coating device further comprises a stirrer for stirring food contained in the receptacle, the receptacle and the stirrer being arranged to be moved relative to each other to stir and coat the food with a film of fat.

35. A dry fryer according to claim 24, wherein the holder is removably mounted relative to the main body.

36. The dry fryer of claim 34, further comprising a main heater mounted on the main body and arranged to generate a flow of heat orientated so as to strike substantially directly at least a portion of the food.

37. The dry fryer of claim 36, wherein the flow of heat is a flow of hot air or a flow of heat emanating from infrared heating.

* * * * *